United States Patent [19]

Herr

[11] 4,019,406
[45] Apr. 26, 1977

[54] MODULAR POWER TRANSMISSION WITH SELF-ENERGIZING CLUTCH

[75] Inventor: Charles H. Herr, Peoria, Ill.
[73] Assignee: Caterpillar Tractor Co., Peoria, Ill.
[22] Filed: Aug. 20, 1975
[21] Appl. No.: 606,151

Related U.S. Application Data

[62] Division of Ser. No. 459,109, April 8, 1974, Pat. No. 3,916,729.

[52] U.S. Cl. .................................. 74/766; 74/753
[51] Int. Cl.² ..................... F16H 57/10; F16H 3/44
[58] Field of Search ............ 74/781 R, 751, 606 R, 74/753, 766

[56] References Cited

UNITED STATES PATENTS

| | | | |
|---|---|---|---|
| 1,817,307 | 8/1931 | Haase et al. | 74/606 |
| 2,006,172 | 6/1935 | Klappauf | 74/606 R |
| 2,192,146 | 2/1940 | Nightenhelser et al. | 74/606 |
| 2,332,593 | 10/1943 | Nutt et al. | 74/781 |
| 3,209,620 | 10/1965 | Moan | 74/781 |
| 3,277,746 | 10/1966 | Forster et al. | 74/781 |
| 3,501,980 | 3/1970 | Arick | 74/781 |
| 3,864,990 | 2/1975 | Lacoste | 74/606 R |
| 3,946,624 | 3/1976 | Murakami | 74/753 |

Primary Examiner—Samuel Scott
Assistant Examiner—Wesley S. Ratliff, Jr.
Attorney, Agent, or Firm—Phillips, Moore, Weissenberger, Lempio & Majestic

[57] ABSTRACT

A power transmission comprises one or more sequential modules each including a modular portion of an enclosure for the complete transmission, a planetary gear set, a direct drive clutch, a self-energizing reduction brake and a hydraulic control system preferably adapted to substantially simultaneously condition the direct drive clutch and reduction brake for establishing either a direct or reduction drive mode for each module. The self-energizing reduction brake is a friction device providing an automatically operable coupling between rotatable elements and includes a first friction component having a plurality of friction discs and a second split friction component having friction discs interleaved with those of the first component, split portions of the second friction component being axially movable by engagement with circumferentially spaced-apart, spiral teeth on the fixed housing for causing engagement and disengagement of the friction discs with control apparatus being operable to maintain the split portions of the second friction component in spaced-apart relation to assure disengagement of the reduction brake.

5 Claims, 17 Drawing Figures

| SPEED | | CLUTCH ENGAGED | | | | | | | | | | | GEAR RATIO |
|---|---|---|---|---|---|---|---|---|---|---|---|---|---|
| | | 19 | 36 | 41 | 37 | 42 | 38 | 43 | 39 | 44 | 52 | 53 | |
| 1F | CONV | | | X | | X | | X | | X | X | | 5.063 |
| | LOCK | NA | | | | | | | | | | | |
| 2F | CONV | | X | | | X | | X | | X | X | | 3.375 |
| | LOCK | X | X | | | X | | X | | X | X | | |
| 3F | CONV | | X | | X | | | X | | X | X | | 2.250 |
| | LOCK | X | X | | X | | | X | | X | X | | |
| 4F | CONV | | X | | X | | X | | | X | X | | 1.500 |
| | LOCK | X | X | | X | | X | | | X | X | | |
| 5F | CONV | | X | | X | | X | | X | | X | | 1.000 |
| | LOCK | X | X | | X | | X | | X | | X | | |
| 1R | CONV | | | X | | X | | X | | X | | X | 10.125 |
| | LOCK | NA | | | | | | | | | | | |

Fig. 3A

| GEAR | CLUTCH TORQUE FOR INPUT TORQUE OF 1.00 | | | | | | | |
|---|---|---|---|---|---|---|---|---|
| | 36 | 41 | 37 | 42 | 38 | 43 | 39 | 44 |
| 1F | | .500 | | .750 | | 1.125 | | 1.688 |
| 2F | .333 | | | .500 | | .750 | | 1.125 |
| 3F | .333 | | .333 | | | .500 | | .750 |
| 4F | .333 | | .333 | | .333 | | | .500 |
| 5F | .333 | | .333 | | .333 | | .333 | |

Fig_8_

Fig_8A_

MODULAR POWER TRANSMISSION WITH SELF-ENERGIZING CLUTCH

REFERENCE TO RELATED CASES

This is a division of U.S. application Ser. No. 459,109, filed Apr. 8, 1974, now U.S. Pat. No. 3,916,729.

BACKGROUND OF THE INVENTION

The present invention relates to a power transmission including one or more speed ratio modules each capable of operating in either a direct or reduction drive mode. The invention preferably contemplates the power transmission as having a modular construction wherein each speed ratio module includes a portion of the housing for the entire power transmission. The invention also particularly contemplates a unique friction device which is self-energizing to provide a selective coupling between relatively rotatable elements such as may be found in a power transmission of the type referred to above.

In the past, power transmissions have usually been designed in contemplation of a particular application. Accordingly, for a relatively broad line of vehicles or machines there may arise a need for a correspondingly wide variety of power transmissions. Generally, the need for efficient operation of a power transmission within each of the vehicles or machines has dictated the production of a generally unique power transmission for each application. This in turn has led to the need for manufacturing and stocking a large variety of parts for the various power transmissions.

It is also noted that power transmissions of the type contemplated by the present invention have generally required at least a direct drive clutch or brake and a reduction drive clutch or brake in combination with each planetary gear set in the power train. Complex mechanisms are commonly required for synchronizing operation of the various gear trains of the power transmission and particularly for precisely timing operation of the large number of clutches or brakes associated with the various speed ratio gear sets within the power transmission. The need for such mechanically complex control systems has also resulted in a substantial expense for manufacture and maintenance of the power transmission.

It has also been known in the past to employ self-energizing friction devices within such power transmissions for selectively coupling relatively rotatable shafts or elements. Cam and roller or sprague-type overrunning devices, for example, are often employed for this purpose in power transmissions. However, such devices have certain limitations. For example, they generally are self-energizing only in one direction of relative rotation. Thus, they may be employed to transmit drive torque from an input shaft to an output shaft while not being capable of transmitting coast torque from the output shaft to the input shaft.

A one-way, self-energizing friction device of the type referred to immediately above may be seen in U.S. Pat. No. 2,939,343. Additional examples of overrunning devices which are self-actuating in only one direction of relative rotation may be seen in U.S. Pat. Nos. 3,567,000 and 3,730,314, assigned to the assignee of the present invention.

It is particularly contemplated within the present invention to provide a power transmission speed ratio module which may be assembled to form a variety of power transmissions suited for different machine or vehicle applications. Such power transmissions normally include an input module such as a torque converter or slipping clutch followed by one or more speed ratio modules according to the present invention and a suitable output module. The present invention even more particularly contemplates use of such modules to form automatically controlled power shift transmissions adapted for either on-highway or off-highway vehicles. Within such applications, the power shift transmissions serve to extend the working speed and torque range of any selected prime mover such as a piston engine, rotary combustion engine, gas turbine or electric motor, for example.

The primary purpose of the present modular concept for power transmissions is the reduction of manufacturing and service costs while maintaining reliability of operation. The use of identical speed ratio modules or a selected series of such modules having different reduction ratios would reduce the number of parts required in power transmissions for a variety of applications. This in turn would permit volume production of the transmission parts and the use of automated production facilities.

As noted above, the present invention also particularly contemplates numerous specific features which may be employed within a modular power transmission of the type discussed above as well as in other applications. Such specific features include, but are not limited to, the self-energizing clutch or friction device referred to above as well as a common control assembly employed to condition both the direct drive clutch and the reduction drive clutch to selectively establish different speed ratios within each module.

The term "friction device" is employed below and particularly within the claims with the intention of encompassing both clutches and brakes, for example. The particular device as illustrated in the drawings outlined below and described within the specification may arguably be considered a brake, since one portion of the device is fixed against rotation. In particular, the friction device serves to condition the transmission or a modular portion thereof for the transmission of torque in different modes depending upon operating conditions and associated control apparatus.

SUMMARY OF THE INVENTION

Accordingly, it is an object of the present invention to provide apparatus for overcoming one or more of the problems summarized above as well as for achieving one or more of the noted advantages.

It is a particular object of the invention to provide a modular construction for power transmissions in order to facilitate the construction or assembly of power transmissions adapted to a variety of applications, for example.

It is a further object of the invention to provide a speed ratio module for a power transmission wherein a direct drive clutch and a reduction are both operated in common by suitable control apparatus in order to simplify construction, operation and maintenance of the transmission.

It is also a particular object of the invention to provide a modular power transmission wherein each speed ratio module includes a housing forming a portion of an enclosure for the entire power transmission.

It is another particular object of the invention to provide a self-energizing friction device for providing a selectively operable coupling between relatively rotatable elements.

The self-energizing friction device may be employed within power transmissions of the type referred to above as well as in other applications. The invention particularly contemplates use of the self-energizing friction device as a reduction brake which may be conditioned to automatically transmit drive torque from an input member to an output member as well as for transmitting coast torque from the output member to the input member. This capability of the friction device may also be employed in other applications to achieve a selective coupling between rotatable elements upon the initiation of relative rotation therebetween in either direction.

Additional objects and advantages of the invention are made apparent in the following description having reference to the accompanying drawings.

Figure 1:
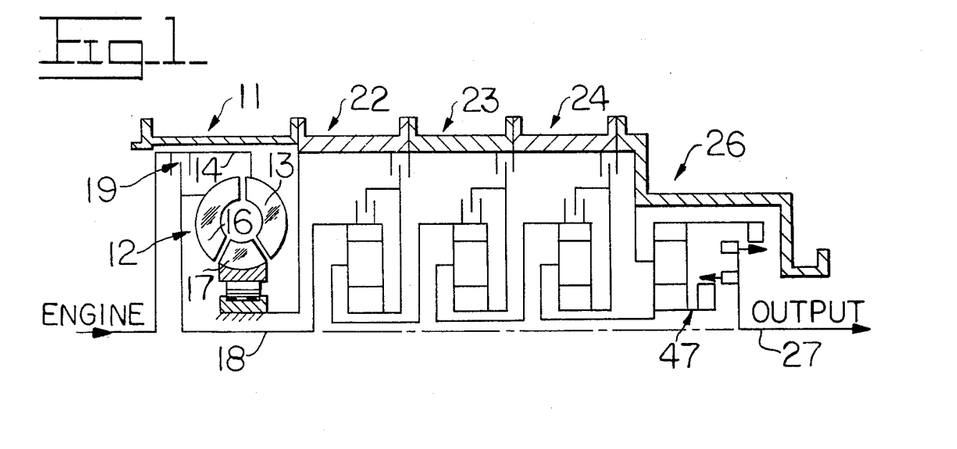
FIG. 1 is a schematic representation, with parts in section, of a power transmission constructed according to the present invention and having three speed ratio modules providing four speed ratios.
Figure 2:
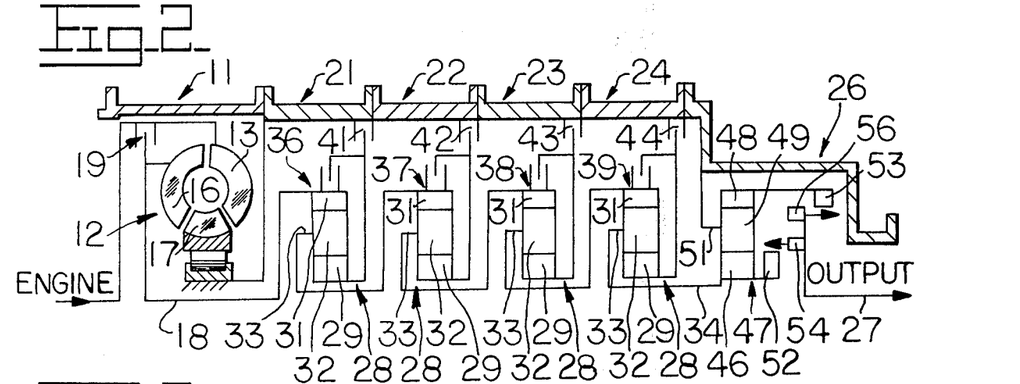
FIG. 2 is a view similar to FIG. 1 except that its power transmission has four speed ratio modules providing five speed ratios.

Referring now to the drawings, FIGS. 1 and 2 schematically represent power trains of the type contemplated by the present invention. Each of these power trains includes an input module 11 for receiving power from a prime mover such as an engine. The input module 11 preferably comprises a torque converter 12 having its impeller element 13 coupled with the engine by means of an input element or rotatable housing indicated at 14. The turbine element 16 is conventionally associated with the impeller element 13 and a stator element 17 while also being coupled for rotation with an output shaft 18 of the torque converter module. A conventional lock-up clutch 19 is selectively operable to mechanically couple the input element 14 with the output shaft 18 in order to effectively bypass the torque converter.

The input module 11 is sequentially coupled with one or more speed ratio modules preferably constructed in accordance with the present invention. For example, the power transmission of FIG. 1 includes three speed ratio modules providing a selection of four speed ratios within the power transmission. The power transmission of FIG. 2 includes four speed ratio modules indicated respectively at 21, 22, 23, and 24, the last speed ratio module for each of the power trains being coupled with an output module 26 which has a directional function for driving an output shaft 27 in either forward or reverse.

Each of the speed ratio modules includes a planetary gear set 28 having a sun gear 29 and a ring gear 31. Planetary gears 32 are mounted upon a rotatable carrier element indicated at 33 while being in meshing engagement with both the sun gear 29 and the ring gear 31.

The ring gear 31 of the first speed ratio module 21 is coupled with the output shaft 18 of the torque converter module. The carrier element 33 delivers output torque from the speed ratio module 21 and is accordingly coupled with the ring gear 31 of the next adjacent speed ratio module 22. Similarly, the carrier elements of the speed ratio modules 22 and 23 are coupled respectively with the ring gears 31 of the speed ratio modules 23 and 24 respectively. The carrier element 33 for the final speed ratio module 24 is coupled with a shaft 34 which also acts as an input for the directional module 26.

The speed ratio module 21 includes a direct drive clutch 36 which is engageable to couple the respective ring gear 31 for rotation together with the sun gear 29 of the same planetary gear set. The successive speed ratio modules 22, 23, and 24 have similar direct drive clutches indicated respectively at 37, 38 and 39. The direct drive clutches function upon engagement to provide a unitary drive ratio across their respective speed ratio modules.

Each speed ratio module also has a reduction brake indicated respectively for the four speed ratio modules of FIG. 2 at 41, 42, 43 and 44. Each reduction brake is selectively operable in a manner described in greater detail below to lock the respective sun gear 29 against rotation whereupon the planetary gears 32 are caused to rotate between the driven ring gear 31 and the fixed sun gear 29 to cause rotation of the associated carrier at reduced speed and increased torque.

The output shaft 34 from the final speed ratio module 24 is coupled with the sun gear 46 of a planetary gear set 47 in the directional module 26. The planetary gear set 47 also includes a ring gear 48 and a plurality of planetary gears 49 intermeshed between the sun gear 46 and ring gear 48 while being mounted upon a carrier element 51 which is fixed against rotation.

Directional transmission from the planetary gear set 47 to the output shaft 27 is established by sliding collar gears 52 and 53 which are coupled respectively with the sun gear and the ring gear. The collar gears 52 and 53 are respectively engageable with gears 54 or 56 arranged upon the output shaft 27 to drive the output shaft 27 in forward or reverse directions respectively.

The module 26 is highly efficient directional unit while requiring substantially complete termination of movement in its planetary gear set 47 before shifting the collar gears 52 and 53 for changing the direction of rotation of the output shaft 27. Accordingly, the directional module 26 is particularly contemplated for use in on-highway vehicles while another directional module is described below for use in combination with the same type of speed ratio module in applications requiring more rapid and more frequent directional changes.

The particular arrangement of the speed ratio modules is selected to provide an effective gradient in speed ratios for the entire power transmission. For example, in the first speed of the power transmission in FIG. 2, each module has its reduction brake engaged with reaction torque being distributed among the four reduction brakes 41–44. Assuming a 1.5:1 reduction ratio, the overall reduction across the four speed ratio modules would be $1.5^4$ or 5.063. Since reaction torque is the difference between output torque and input torque, for a module with 1.5:1 reduction and input torque taken as unity, output torque would be 1.5 and reaction torque would be 0.5. Accordingly, in the power transmission of FIG. 2, assuming an input torque to the first speed ratio module 21 of 1.0, reaction torque on the brake 41 would be 0.5. Reaction torque on the brake 42 would be 0.75. Similarly, reaction torque would be 1.25 on the reduction brake 43 and 1.688 on the reduction brake 44. Accordingly, even with maximum reduction across the power transmission, the reaction torque is relatively limited for any given brake.

Figure 3:
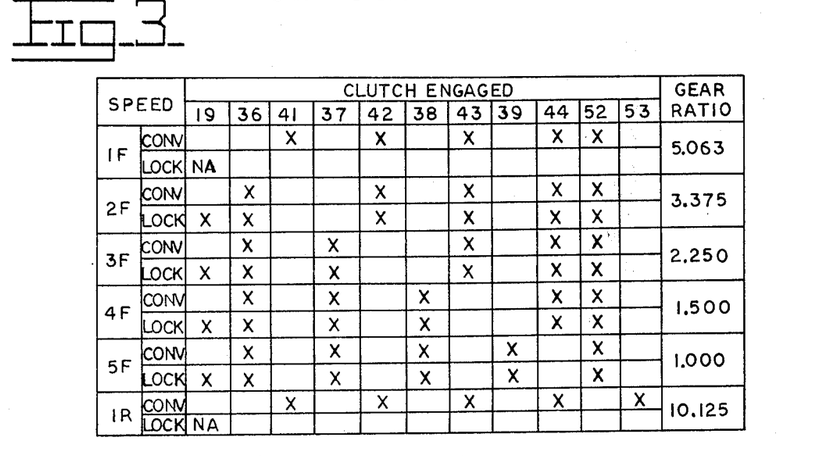
FIG. 3 is a tabular representation denoting those clutches within the power transmission in FIG. 2 which are engaged to provide each speed as well as the resulting gear ratio.
Figure 3A:
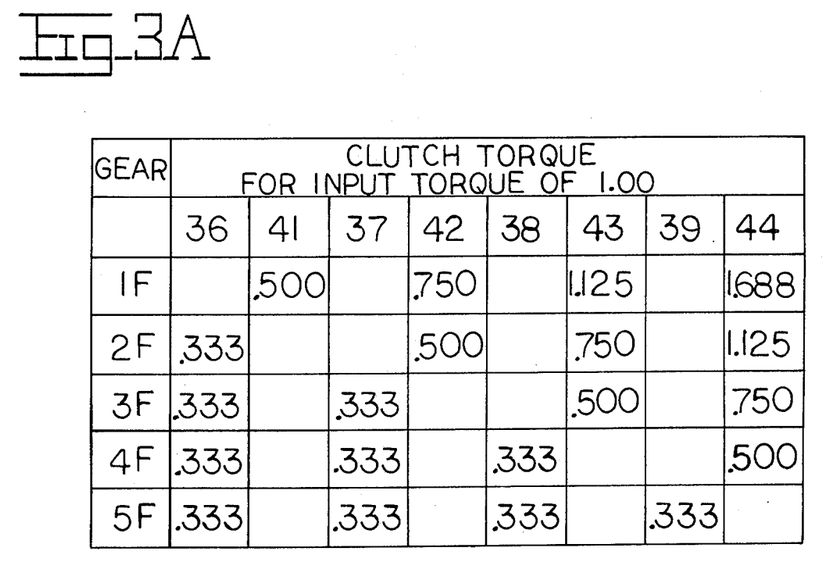
FIG. 3a is also a tabular representation denoting the relative torque developed in each of the clutches of the power transmission of FIG. 2 for each of the five speed ratios assuming input torque of 1.00.

Upon engagement of the respective direct drive clutches, the sungears and ring gears are locked together and accordingly cause the carrier to be rotated at the same speed so that torque input equals torque output across each of the speed ratio modules so engaged. This relationship may be further seen from a review of FIG. 3 which lists the gear ratio established within each operating speed ratio and indicates the engaged condition of the clutches. FIG. 3A lists the corresponding torque resulting upon each clutch within the various speed ratios. The two charts taken together indicate a relatively uniform gradation between gear ratios while also indicating relatively minimum and uniform torque applied to the various clutches and brakes. This arrangement for the speed ratio modules is preferred within the present invention where the speed ratio modules are constructed with modular portions for assembly into the complete power transmission.

Figure 5:
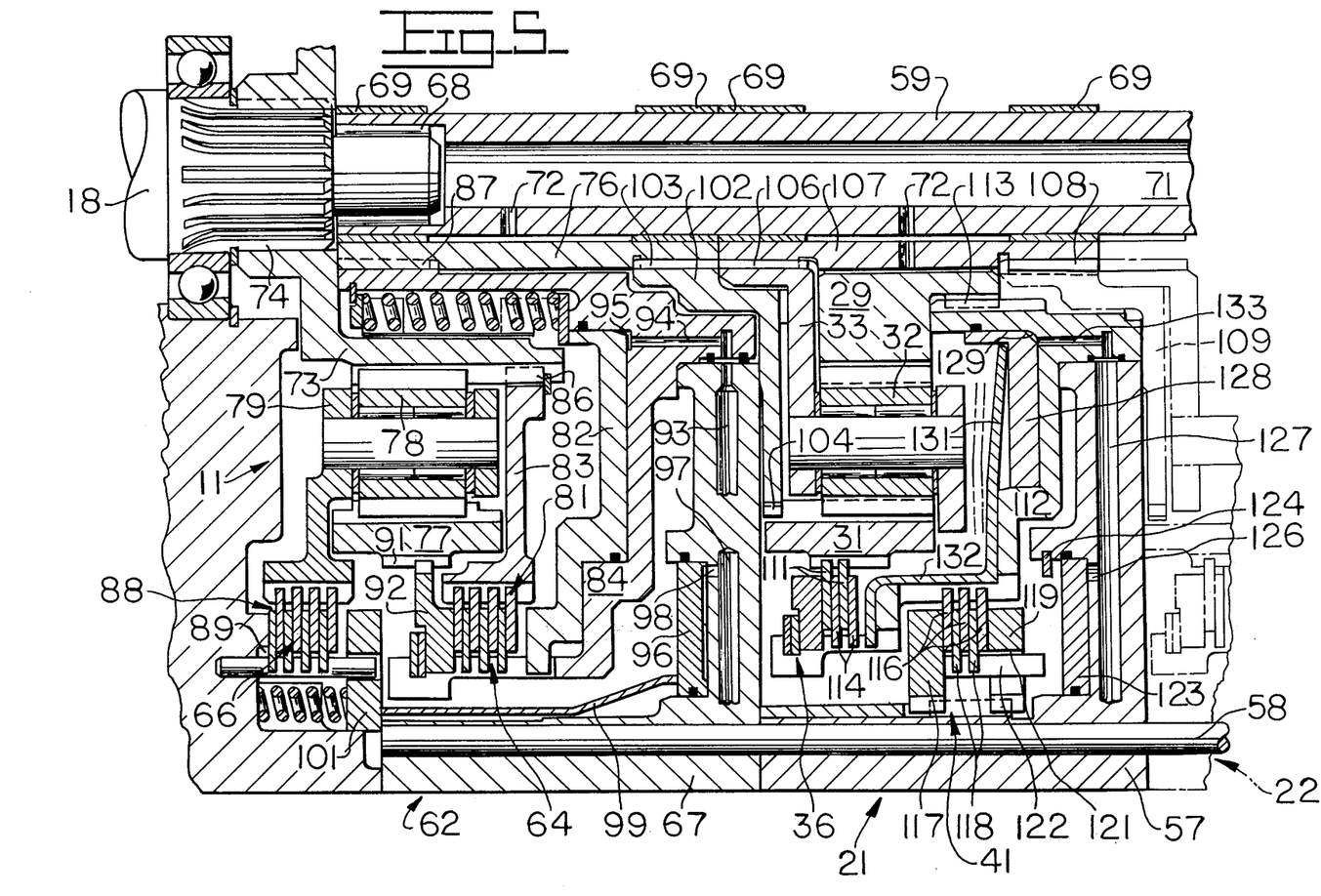
FIG. 5 is a vertically sectioned view of a directional module and sequentially adjacent speed ratio module from a power transmission such as that also illustrated in FIG. 4.
Figure 6:
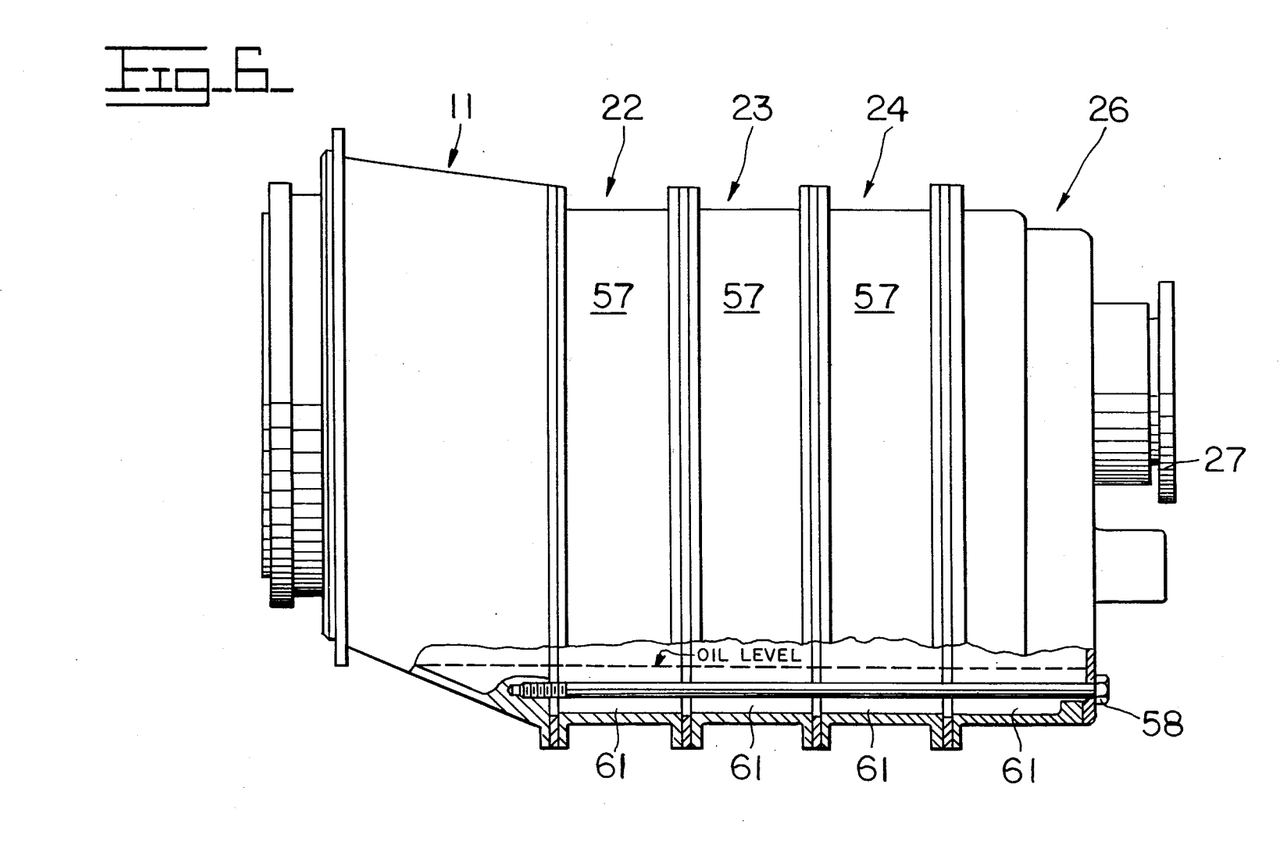
FIG. 6 is a side view of a power transmission of the type also illustrated in FIG. 1, with parts broken away to illustrate modular construction of the transmission according to the present invention.

As may be best seen from FIGS. 5 and 6, each of the speed ratio modules is formed with a separate fixed housing 57 of similar construction so that the housing portions of the sequentially arranged speed ratio modules combine to form an enclosure for the assembled power transmission. The housing portions 57 are secured together by elongated bolts 58 (see FIG. 5). The joints between the housing portions 57 are conventionally sealed, preferably by means of a liquid gasket material (not shown).

Additional features include a common center shaft indicated at 59 in FIG. 5 for supporting the planetary gear sets of the sequentially arranged speed ratio modules. In addition, a lower portion of each modular housing 57 includes a sump passage 61 extending thereacross. When the housing portions are assembled together, a common sump is formed for the assembled power transmission as best seen in FIG. 6. This feature enables the housing portions 57 to be assembled into a finished enclosure since the common sump eliminates the need for a conventional oil pan arrangement extending beneath the sequentially arranged modules.

Figure 4:
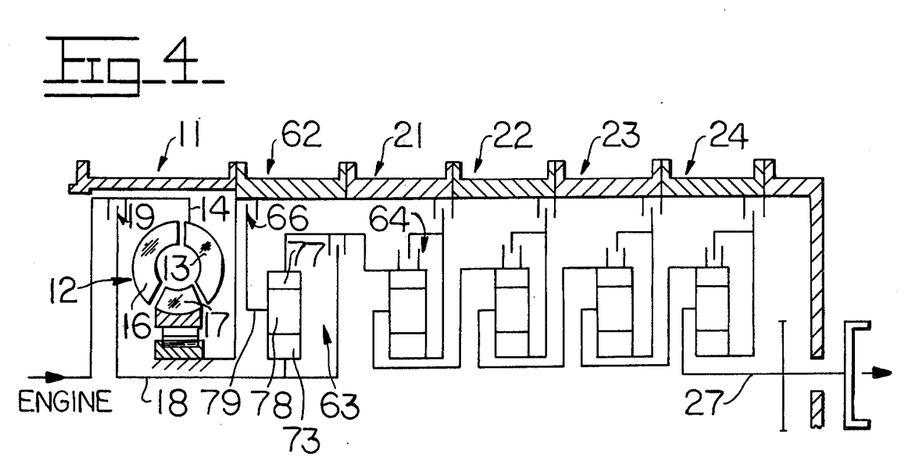
FIG. 4 is another schematic representation of a power transmission similar to that of FIG. 2 while including a different directional module for establishing forward and reverse operation.

FIG. 4 is a schematic representation of a power transmission generally similar to that of FIG. 2 in that it includes four similar speed ratio modules 21–24. However, in place of the directional output module 26 of FIG. 2, a directional module 62 is inserted between the torque converter module 11 and the first speed ratio module 21. The directional module 62 also has a planetary gear set 63 while including frictional clutches 64 and 66 which are respectively engaged to provide a forward or reverse drive connection between the torque converter module 11 and the first speed ratio module 21. A directional module of the type indicated at 62 facilitates faster or more frequent directional changes and accordingly is more desirable for use in off-highway vehicles. The clutches in the power transmission of FIG. 4 are engaged in generally the same manner as those of FIG. 2 with the gear ratios and resultant torques for the various clutches also being similar to those in the tables of FIGS. 3 and 3A.

The manner of operation for the directional modules 26 and 62 is described in greater detail below along with details of construction and operation for the speed ratio modules 21–24. As noted above, the construction and manner of operation for the reduction brakes 41–44 is believed to be a particularly novel feature of the present invention as well as the common actuating arrangement for the direct drive clutch and reduction brake of each speed ratio module.

Referring now to FIG. 5 as well as FIG. 4, the directional module 62 includes a stationary housing portion 67 of similar construction as the housing portions 57 for the various speed ratio modules. Accordingly, the directional module 62 may be readily assembled in sequential relation between the converter module 11 while being secured in place by the bolts 58.

The converter module 11 is partially illustrated in FIG. 5 together with its output shaft 18. The common center shaft 59 may be supported at its leftward end, as viewed in FIG. 5, upon the input shaft 18 by means of a coupling generally indicated at 68. The center shaft 59 provides support for a plurality of bearing supports 69 pressed in shaft 76 in module 62 and shafts 107 in modules 21–24.

The center shaft 59 also includes an axial passage 71 in communication with respective outlet passages 72 for communicating lubricating oil from a source (not shown) to each of the modules illustrated in FIG. 5 and FIG. 2. The right end of the common center shaft 59 is similarly supported upon an output shaft by means of a bearing or coupling similar to that indicated at 68 in FIG. 5, (also see FIG. 10).

The planetary gear set 63 of the directional module 62 has a sun gear 73 which is coupled with the input shaft 18 by means of splines 74. The directional module 62 also includes an output sleeve 76 supported for rotation upon the center shaft 59 by means of the bearing supports 69. The output sleeve 76 provides a coupling with the adjacent module 21 in a manner described in greater detail below. Respective engagement of the friction clutches 64 and 66 causes rotation of the output sleeve 76 so that the speed ratio module 21 and successive portions of the power transmission are operated in a forward or reverse direction respectively.

The planetary gear set 63 of the directional module 62 also includes a ring gear 77 with a plurality of planetary gears 78 arranged in meshing engagement between the ring gear 77 and the sun gear 73. The planetary gears 78 are supported by a carrier 79.

The forward friction clutch 64 includes interleaved friction discs engageable with each other through axial movement of a piston 82 to couple a gear member 83 together with a rotatable housing member 84. The gear member 83 is also secured to the sun gear 73 by splines 86 while the housing member 84 is secured to the output sleeve 76 by means of splines 87. Accordingly, engagement of the forward clutch 64 serves to lock the sun gear 73 for rotation with the output sleeve 76 with the output sleeve 76 rotating in the same direction as the input shaft 18.

The reverse clutch 66 also includes interleaved friction discs 88 which are engageable to lock the carrier member 79 to a portion 89 of the directional module housing 67 in order to secure the carrier member against rotation. With the reverse clutch or brake 88 engaged, the ring gear 77 is driven in the opposite direction from the sun gear 73 through the planetary gear 78. Since the housing member 84 is secured to the ring gear 77 by means of a spline coupling 91 and an annular coupler 92, the output sleeve 76 is rotated in the opposite direction so that the adjacent speed ratio module 21 and successive portions of the power transmission are driven in reverse. The forward clutch 64 is engaged by hydraulic fluid under pressure introduced through passages 93 and 94 into an annular cavity 95 adjacent the piston 82. Similarly, the reverse brake is actuated or engaged by hydraulic fluid under pressure being communicated against the piston 96 through passages 97 and 98. Movement of the piston 96 is transmitted to the reverse brake 88 by means of a sleeve 99 and a pressure plate 101. Hydraulic fluid under pressure may be selectively introduced into the passages 93 and 97 for actuating the forward and reverse clutches 64 and 66 by conventional control means (not shown).

As noted above, the speed ratio modules 21-24 are of similar construction. Accordingly, the following description which is particularly directed toward the speed ratio module 21 also applies to the other speed ratio modules 22-24. However, it is to be noted that where a large variety of power transmissions are required for different applications, a family of speed ratio modules may be designed, particularly for the purpose of providing a variety of reduction ratios. Accordingly, if such a family of speed ratio modules were available, a single power transmission might be assembled in modular fashion from speed ratio units having different reduction ratios. This might permit a succession of stepped gear ratios better suited to a particular application.

Referring again to FIG. 5, drive torque from the output sleeve 76 of the directional module 62 is delivered to the first speed ratio module 21 by an input gear 102. The gear is respectively coupled with the output sleeve 76 and the ring gear 31 by spline connections indicated respectively at 103 and 104. The carrier element 33 of the speed ratio module 21 is coupled by means of a spline connection 106 with an output sleeve 107 which is of substantially similar construction as the output sleeve 76 in the directional module 62. The output sleeve 107 is also mounted upon the common center shaft 59 by means of the bearing supports 69 and is coupled by means of a spline connection 108 with an input gear 109 for the next adjacent speed ratio module 22. The input gear 109 of course corresponds with the input gear 102 for the speed ratio module 21. The successive portions of the speed ratio module 22 also conform to portions described herein for the speed ratio module 21.

To provide a direct drive coupling across the speed ratio module 21, the direct drive clutch 36 is engaged to effectively couple the ring gear 31 for rotation together with the sun gear 29. The carrier 33 is driven at the same rotating speed by the planetary gears 32 to provide a direct drive coupling between the input gear 102 and the output sleeve 107.

The ring gear 31 provides a first friction component for the direct drive clutch 36 and carries a plurality of friction discs 111. A common clutch hub 112 is coupled with the sun gear 29 by means of a spline connection 113 and extends outwardly to annularly surround the ring gear 31. The clutch hub 112 forms a second friction component for the direct drive clutch 36 and also carries a plurality of friction discs 114 which are arranged in interleaved relation with the friction discs 111.

The reduction brake 41 is particularly contemplated as being self-energizing to provide a selective coupling between the sun gear 29 by means of the common clutch hub 112 with the fixed housing 57 for the speed ratio module 21. Construction details for the reduction brake 41 are set forth in substantially greater detail below with reference to FIG. 7.

It is important at this point to note that the common clutch hub 112 also acts as one friction component for the reduction brake 41. Accordingly, the common clutch hub 112 carries another set of friction discs 116. A second split friction component for the reduction brake 41 is formed by a brake drum 117 carrying a plurality of friction discs 118 arranged in interleaved relation with the friction discs 116. The second friction component of the reduction brake 41 also includes a reaction disc 119 which is secured for rotation with the brake drum 117 while being axially movable in relation to the brake drum 117. Axial movement between the drum 117 and reaction disc 119 serves to regulate engagement and disengagement between the interleaved friction discs 116 and 118. The reaction disc 119 also includes a plurality of axially extending slots 121 formed about its periphery. The brake drum 117 has a plurality of axially extending fingers 122 which penetrate the slots 121 for the purpose of permitting positive disengagement of the reduction brake 41.

The manner in which the reduction brake 41 responds to relative rotation between the sun gear 29 and the fixed housing 57 to cause engagement or disengagement between the interleaved friction discs 116 and 118 is described below with reference also to FIG. 7. However, the components described above are sufficient to permit an understanding of a common control apparatus for simultaneously conditioning the direct drive clutch 36 and the reduction brake 41 to establish a preferred manner of torque transmission through the speed ratio module 21.

The brake drum 117 may be maintained in a position shifted axially away from the reaction disc 119 by means of a blocker piston 123 slidably arranged in axial alignment with the fingers 122. Leftward movement of the blocker piston 123 is limited by a retaining ring 124 with the piston 123 being movable in response to fluid under pressure received through a communicating passage 126 from a common fluid passage 127.

Another actuating piston 128 for the direct drive clutch is slidably arranged within a cavity 129 formed by the common clutch hub 112. The piston 128 interacts with a finger spring 131 having an extending portion 132 arranged to selectively provide clamping force for the interleaved friction discs 111 and 114 of the direct drive clutch 36.

Hydraulic fluid for shifting the piston 128 leftwardly against the finger spring 131 is communicated from the common fluid passage 127 through a restrictive orifice 133. As fluid pressure is introduced into the common passage 127, it immediately shifts the blocker piston 123 leftwardly to assure axial separation between the brake drum 117 and the reaction disc 119. Almost simultaneously, fluid from the passage 127 acts against the piston 128 to shift both the piston 128 and finger spring 131 leftwardly to clamp the interleaved friction discs 111 and 114 together and establish an engaged condition for the direct drive clutch 36. However, the restrictive effect of the orifice 133 and the high-rate spring effect of the finger spring 131 serve to modulate engagement of the direct drive clutch 36 and thus facilitate shifting of the speed ratio module 121 into a direct drive condition.

Through this arrangement, the provision of control signals for operating both the direct drive clutch 36 and the reduction brake 41 is particularly simplified. For example, the speed ratio module 21 may be upshifted into a direct drive condition by a single fluid pressure signal introduced into the common fluid passage 127. Similarly, the speed ratio module may be downshifted from a direct drive condition into a condition where the reduction brake 41 functions automatically to provide reduction drive by simply evacuating fluid pressure from the common passage 127. The provision of the common clutch hub 112 as a friction component in each of the direct clutch 36 and the reduction brake 41 obviates or reduces the need for complex apparatus to assure proper timing in the control system for these two clutches, while also assuring continuous torque transmission across each speed ratio module during speed ratio shifts.

The reduction brake 41 is self-energizing in either direction when the respective speed ratio module is in a reduction drive mode. The brake 41 may also be conditioned by the blocker piston 112 to act as an overrunning clutch when the respective speed ratio module is in a direct drive mode.

The modular transmission disclosed above is a preferred or exemplary environment for the reduction brake. However, it is believed obvious that a friction device including features of the brake 41 can be used to advantage in many applications, primarily as a selective coupling between rotatable elements.

As noted above, the common clutch hub 112 forms one component of the reduction brake 41 while being secured for rotation with the sun gear 29. Both the brake drum 117 and the reaction disc 119, comprising the other friction component of the clutch, are associated with the fixed housing 57 in a manner which may be better seen by having reference also to FIG. 7. Accordingly, within the speed ratio module, the sun gear 29 and the housing 57 are relatively rotatable elements between which the reduction brake of the present invention serves as a selective coupling.

Figure 7:
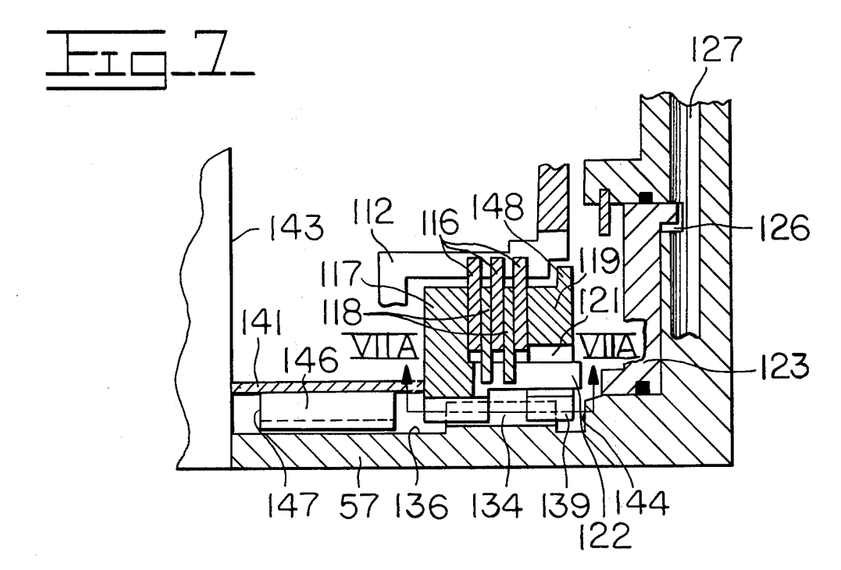
FIG. 7 is an enlarged fragmentary view, with parts in section, of a reduction brake incorporated within the speed ratio module illustrated toward the right of FIG. 5.

Referring now to FIG. 7 as well as FIG. 5, a plurality of spaced apart helical teeth 134 are formed upon an internal surface 136 of the fixed housing 57. The circumferentially spaced apart relation of the teeth 134 may be better seen in FIG. 7A. The brake drum 117 also has a plurality of teeth 137, each of the teeth 137 projecting radially outwardly into a space 138 between a pair of the helical teeth 134. The reaction disc 119 is similarly formed with a plurality of circumferentially spaced apart teeth 139, each of the teeth 139 also projecting radially outwardly into one of the spaces 138.

It is noted again that the brake drum 117 and the reaction disc 119 are secured together for rotation while being axially movable relative to each other. Accordingly, the teeth 137 and 139 are also necessarily fixed together for rotation while being axially movable with relation to each other and within the spaces 138 between the helical teeth 134.

Figure 7A:
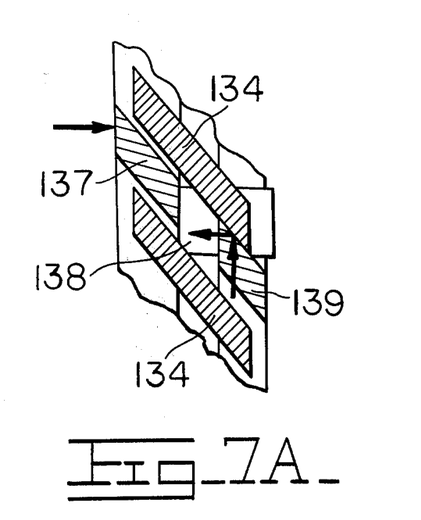
FIG. 7A is a fragmentary view taken along section line A—A of FIG. 7 to better illustrate the angular arrangement of selected portions in the brake.

It may also be seen from FIG. 7A that each of the spaces 138 is substantially larger than the width of the teeth 137 and 139. This is to insure that only one of each pair of teeth 137 and 139 is in engagement with one of the two adjacent helical teeth 134 depending upon the circumferential positioning of the teeth 137 and 139 as determined by the rotation of the brake drum 117 and reaction disc 119. The teeth 137 and 139 also have a helical configuration preferably to facilitate engagement with the helical teeth 134.

Figure 7B:
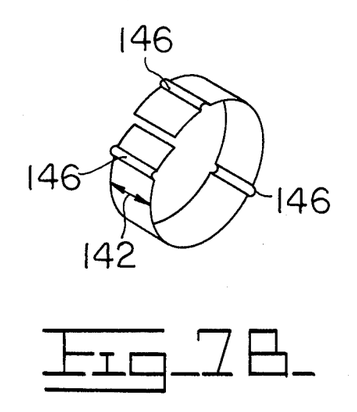
FIG. 7B is an isometric view of a spiral spring associated with the brake of FIGS. 5 and 7.

The interleaved friction discs 114 and 116 have a tendency to be drawn together into engaged condition by surrounding hydraulic fluid upon relative rotation being initiated between the clutch hub 112 and the housing 57. However, the present invention also preferably contemplates resilient means for urging the brake drum 117 and reaction disc 119 axially toward each other to initiate engagement of the reduction drive clutch 141. That function could be accomplished by any resilient means, for example, hydraulic pressure or a plurality of coil springs. However, the resilient means is preferably embodied in a split annular ring having an axially arranged spiral configuration. As may also be seen in FIG. 7B, the spring 141 is formed as a single coil having a selected uniform dimension indicated at 142 relative to the axis of the brake drum 117. The spring 141, constructed in the above manner, serves the dual functions of urging the brake drum 117 rightwardly toward the reaction disc 119 while also serving as a stop to positively limit axial travel of the brake drum 117 away from the reaction disc or in a leftward direction as viewed in FIG. 7, while under compression. As may be seen in FIG. 7, the spring 141 is arranged for axial interaction between the brake drum 117 and a spaced apart surface 143 formed by one of the housing portions 57.

The spring 141 has a number of lugs or projections 146 which serve to radially locate the spring during its interaction with the brake drum 117. The housing portion 57 also forms a stepped surface 144 which limits rightward movement of the reaction disc 119 while allowing the fingers 122 of the brake drum to move freely toward the right for engagement of the friction surface members 116 and 118.

The brake drum 117 and reaction disc 119 tends to move axially toward each other upon relative rotation being initiated between the clutch hub 112 and the housing 57. This axial movement is initiated by engagement of either teeth 137 or 139 with the spiral teeth 134 depending upon the relative direction of rotation. It will also be apparent from a review of FIG. 7 that the blocker piston 123 can maintain the brake drum 177 in a leftwardly shifted position to prevent engagement of the reduction drive clutch 141. In this connection, it may also be seen that the reaction disc 119 has a radially inwardly projecting collar 148 to limit its leftward movement shown in FIG. 11.

The novel configuration and mode of operation for the friction device or reduction brake 41 is made even more apparent by the following description of its operation in conjunction with the speed ratio module 21. The position or condition of the reduction brake 41 as illustrated in FIGS. 7 and 7A corresponds to a reduction drive mode for the speed ratio module where both of the pistons 123 and 128 (see FIG. 5) are fully shifted to the right. Accordingly, the direct drive clutch 36 is disengaged and a reduction drive coupling is provided by the self-energizing reduction brake 41. Assuming that a substantial load is placed upon the output of the entire power transmission and accordingly upon the output shaft 107 for the speed module 21, torque within the reduction blutch 41 is opposite engine torque and the teeth 139 of the reaction disc 119 are in engagement with the spiral teeth 134. As may be seen in FIG. 7A, the reaction disc 119 is thus shifted leftwardly while the brake drum 117 is being shifted rightwardly by the spring 141. Accordingly, the interleaved friction discs 116 and 118 are engaged to secure the clutch hub 112 and the sun gear 29 against rotation. Reaction torque for the brake 41 is applied to the housing portion 57.

Transistion from the reduction drive mode of the speed ratio module into a direct drive mode in accomplished by hydraulic pressure being introduced into the common fluid passage 127 (see FIG. 5). That pressure urges the reaction piston 123 leftwardly and, after a brief delay caused by the orifice 133, also acts upon the piston 128 and shifts it leftwardly as well. As the direct clutch 36 commences engagement, its torque is applied in engine direction from the input gear 102 and ring gear 31 to the clutch hub 112 which is still being held against rotation by the reduction brake 41, wherein torque is opposite to engine rotation as noted above. As the direct clutch torque increases, it correspondingly causes a decrease in torque across the reduction brake 41. When torque within the direct clutch 36 exceeds torque upon the reduction brake 41, the reduction brake begins to rotate in engine direction. This eliminates contact of teeth 139 and establishes contact between teeth 137 and teeth 134. This contact urges brake 41 rightwardly until fingers 122 of drum 117 engage blocker piston 123. With a predetermined clearance between the fingers 122 and slots 121 and in the proper relation, reaction disc 119 can continue to move rightwardly, until the friction surfaces of clutch 41 is eliminated, releasing clutch hub 112 from housing portion 57.

Figure 9:
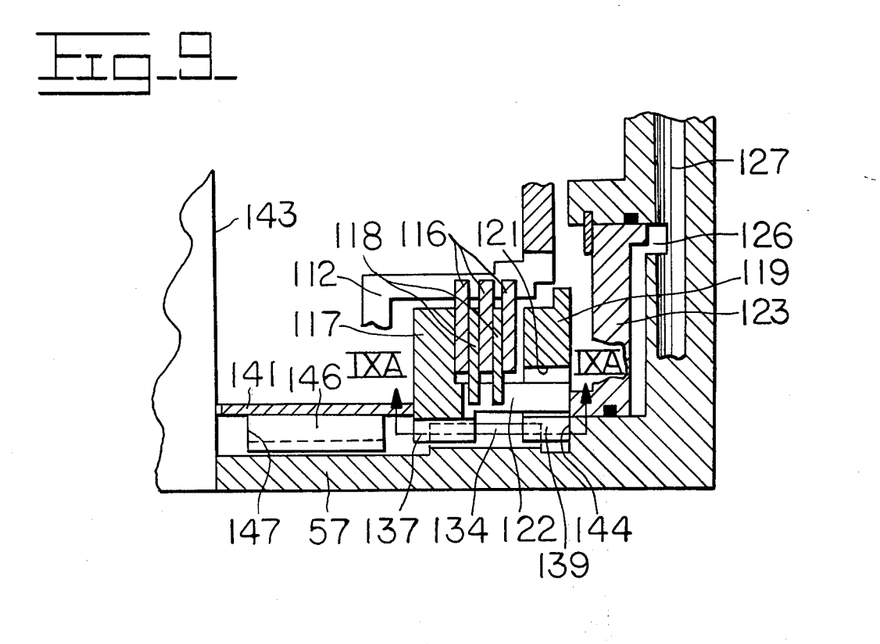
FIGS. 9 and 9A are also similar to FIGS. 7 and 7A while illustrating yet another operating condition of the brake.
Figure 9A:
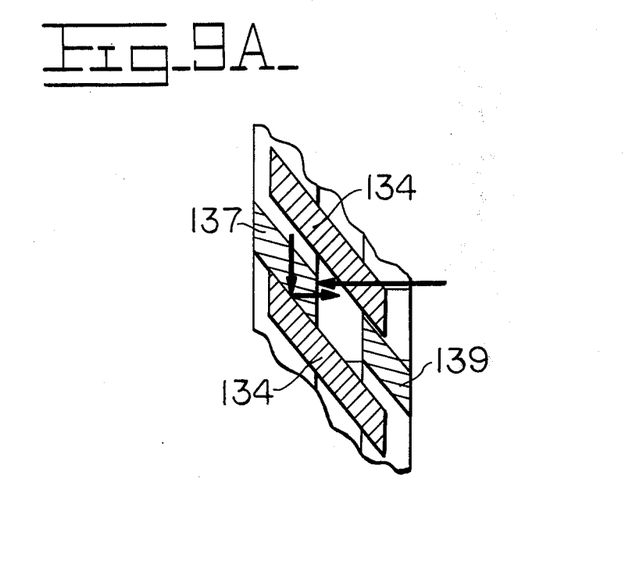

The reduction brake 41 is thus placed in an overrunning condition with the speed ratio module being in its direct drive mode as shown in FIG. 9 and FIG. 9A.

The transition from the direct drive mode of the speed ratio module to its reduction drive mode is accomplished simply by relieving fluid pressure from the common fluid passage 127. As the pistons 123 and 128 again shift toward the right, the direct drive clutch 36 begins to slip, allowing the sun gear 29 and common clutch hub 112 to diminish speed or commence turning backward relative to the direction of engine rotation. As those components stop rotation relative to the housing 57 and commence to actually turn in the opposite direction, the teeth 139 on the clutch drum contact the spiral teeth 134 (as may be best seen in FIG. 7A), thus initiating engagement of the reduction brake 41.

Figure 8:
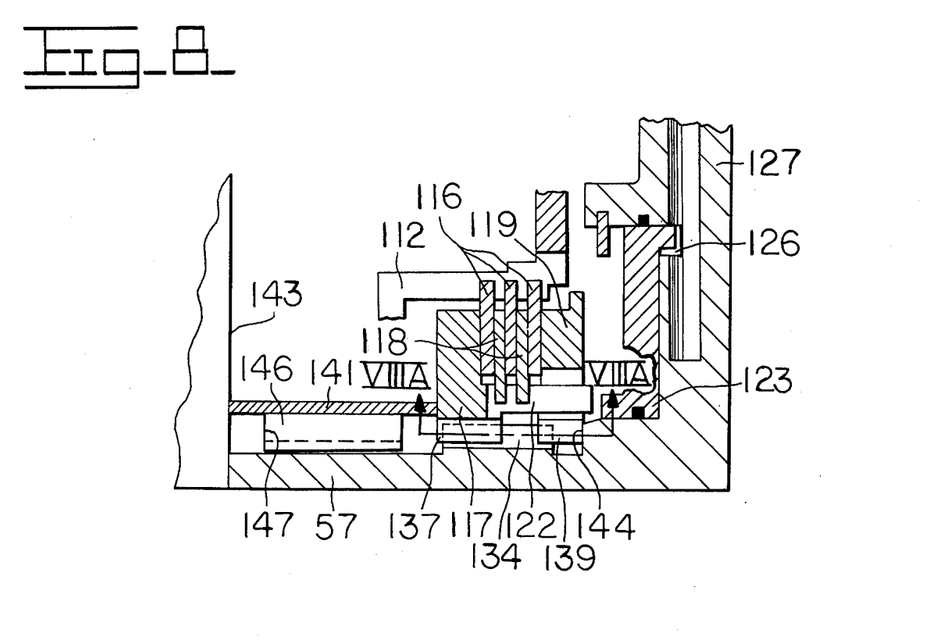
FIGS. 8 and 8A are similar to FIGS. 7 and 7A, except that they illustrate a different operating condition of the brake.
Figure 8A:
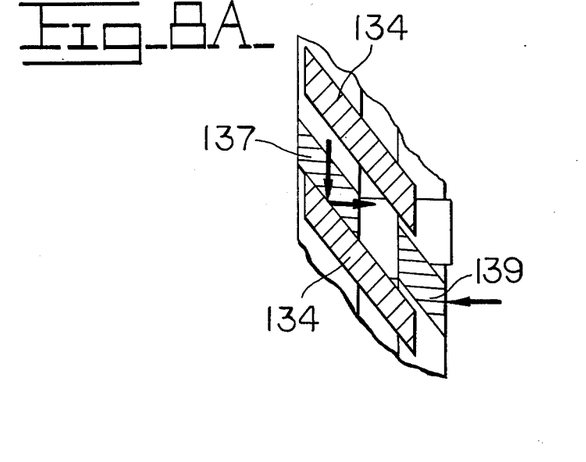

As noted above, an important function of the reduction brake 46 is also to transmit coast torque. "Coast torque" as used herein is intended to define a situation where a load at the output of the power transmission is actually driving a prime mover coupled to the input shaft of the transmission. This condition, of course, commonly occurs in vehicles traveling downhill. Under such conditions, an upshift into a direct drive condition may be forced if the vehicle is not braked and depending upon the control selected for the various components of the power transmission. However, with the speed ratio module remaining in its reduction drive mode, relation of the reduction brake parts is illustrated in FIG. 8A. The reaction disc 119 is shifted rightwardly against the stop 144 and the teeth 137 on the clutch drum are engaged with the spiral teeth 134 to provide clamping force for the reduction brake 41.

Once an uphshift occurs, the blocker piston 123 and direct clutch piston 128 are necessarily pressurized. The blocker piston 123 must then overcome the axial force developed by the clutch assembly in order to move the clutch drum 117 to the left and disengage the reduction brake 46. The direct drive piston 128 is simultaneously moving toward the left, after a slight modulation lag caused by the orifice 133 (see FIG. 5) to initiate full engagement of the drive clutch 36. Engagement of the direct drive clutch 36 is further modulated by the high rate spring 131.

Figure 10:
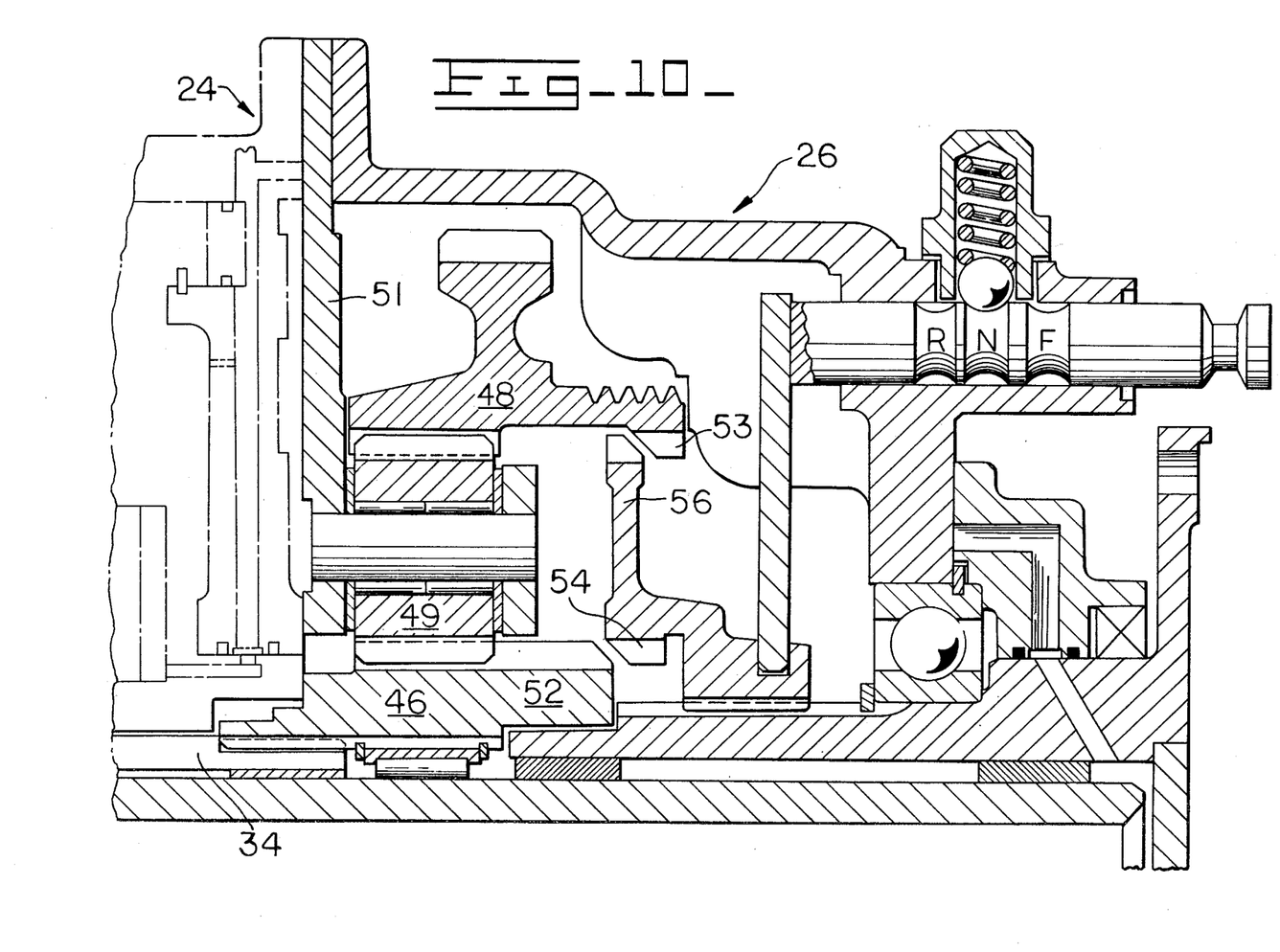
FIG. 10 is a side view in elevation, with parts in section, of a fragmentary portion of one speed ratio module in a power transmission of the type illustrated in FIGS. 1 or 2, as well as the directional module shown at the right end of FIGS. 1 and 2.
Figure 11:
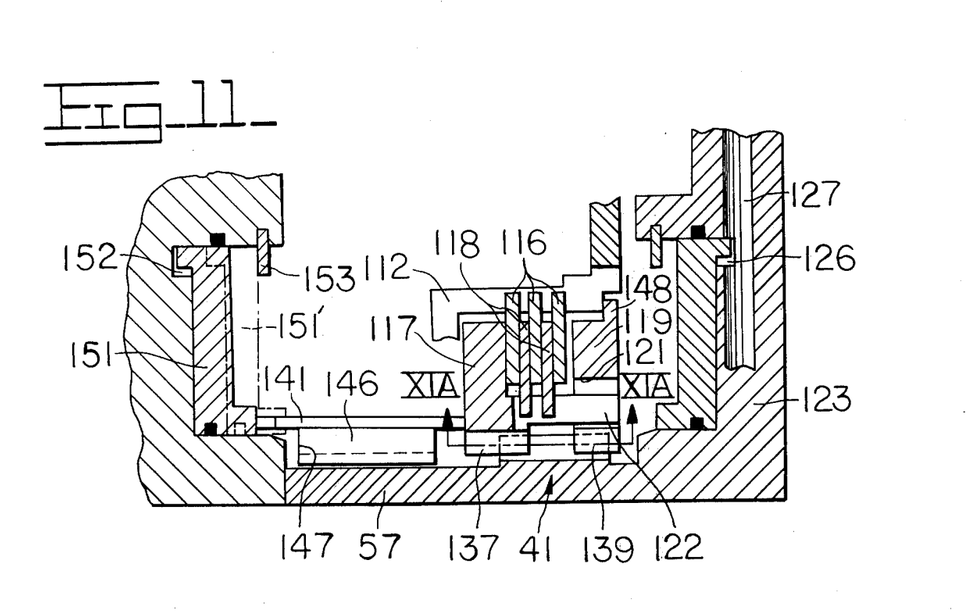
FIG. 11 is a view similar to FIG. 7 while illustrating a selected operating condition of an additional embodiment of the reduction brake within a speed ratio module associated with the directional module of FIG. 10.
Figure 11A:
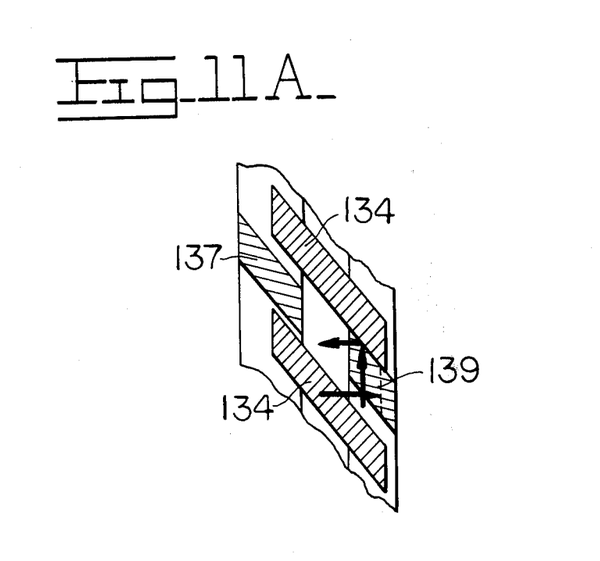
FIG. 11A is a view taken along section line A—A of FIG. 11 to again illustrate the angular relation of selected portions in the reduction brake.

A modification of the reduction brake is illustrated in FIG. 11 and is preferably contemplated for use in at least one of the speed ratio modules employed in either the FIG. 1 or FIG. 2 power transmissions having a directional module as indicated at 26 in FIG. 10. With such a directional module where the direction of operation is determined by engagement of the respective collar gears 52 and 53, it is necessary to provide a means for decoupling the transmission in order to bring all rotating members in the transmission to a full stop. With all of the rotating members being stopped, a directional change may be effected in the module 26. If such synchronization were not provided, the various gears 26 would suffer very rapid wear and possible failure when attempting to shift from neutral position to either forward or reverse. This problem arises particularly when a converter is employed as an input for the power transmission because of the tendency for its fluid coupling to continue driving the power transmission. It would be extremely difficult to disengage either the gears 52 or 53 unless the driving torque is interrupted.

In order to interrupt drive torque through the power transmission for this purpose, a piston 151 provides a movable reaction surface to the left of the spring 141. With the piston 151 moved to the left as illustrated by the solid line position in FIG. 11, the spring 141 and accordingly the brake drum 117 are also allowed to move leftwardly. Leftward movement of the reaction disc 119 is limited by interaction of the stop collar 148 with the clutch hub 112. Since extension of the spring 141 is limited the brake drum 117 is allowed to move sufficiently to the left for disengagement of the reduction brake.

After a directional shift is completed, the piston 151 may be shifted rightwardly, for example, by means of fluid pressure within a cavity 152 from a source (not shown). Rightward motion of the piston 151 is limited by a retaining ring 153 in a position illustrated by broken lines at 151'. With the piston 151 shifted to the right, the spring 141 is again conditioned to permit operation of the reduction brake 41 in the manner described above with reference to FIGS. 5 and 7-9.

It is believed obvious in view of the preceding disclosure, that various modifications are possible for the friction device, as well as the power transmission within the scope of the present invention.

In summary, relative to the friction device, in particular it is responsive to torque transmission or relative rotation of its component parts, either in one direction of relative rotation but preferably in both directions as illustrated in the above disclosure. The device is also self-energizing or self-engaging.

The device is also positively engaging in that it does not absorb energy upon engagement and disengagement as in a conventional disc clutch for example. In other words, the present friction device experiences substantially static, rather than dynamic, engagement and disengagement. Accordingly, its friction disc may be made of material having a very high coefficient of friction to prevent substantially any possibility of slip. The friction discs could also be made of wear-resistant steel to insure reliable operation over a long period of time.

The ability of the device to experience engagement upon initiation of relative rotation between its component parts, either in one or both directions of relative rotation, enables the device to be precisely self-timing. This characteristic facilitates control of the device as exemplified by the common control apparatus for the direct drive clutches and reduction brakes in the power transmission described above.

The particular planetary gear set described above is limited in the spread of reduction ratios. Other types of planetary reduction ratios are also contemplated by the present invention, with the self-energizing device being used to hold the reaction member to the case, and the direct clutch being used to lock the planetary gear set.

An overdrive module could also be employed in such a transmission, and may be similarly regulated by a self-energizing device of the type disclosed above.

Another arrangement using this shift principle could also employ parallel axis shafts connected by different gear ratios. One gear ratio would transmit power through the self-energizing device, and the other ratio through the modulated clutch. The largest reduction ratio, in either an underdrive or an overdrive module would use the self-energizing device.

What is claimed is:

1. A power transmission including a plurality of similar, sequentially arranged modules each providing both direct and reduction drive ratios, each of the modules comprising
    a fixed housing forming a modular portion of the housing for the complete power transmission,
    an input shaft,
    an output shaft, the output shaft of each module within the sequence being coupled with the input shaft of the next succeeding module,
    a planetary gear set having a sun gear, a ring gear and a plurality of planetary gears mounted upon a rotatable carrier and engaged with the ring gear and the sun gear, the input shaft being coupled for rotation with the ring gear and the output shaft being coupled for rotation with the carrier,
    a reduction brake for selectively locking the sun gear against rotation,
    a direct drive clutch selectively engageable for causing rotation of the ring gear together with the sun gear,
    a source of signal fluid under pressure,
    means for operating both the direct drive clutch and reduction clutch in response to a single fluid pressure signal,
    and further comprising
    means securing the fixed housing of the modules together to form an enclosure for the complete power transmission and to assure proper engagement between the output shaft and input shaft for adjacent power transmission modules,
    a common center shaft extending through the plurality of similar sequentially arranged modules and supporting the planetary gear set of each sequential module, and
    each of the modular housing portions being penetrated by a passage formed in the lower portion of the housing, the passages of the assembled modular housing providing a common sump for the complete transmission.

2. The power transmission of claim 1 wherein the common center shaft has an axially extending passage with intersecting cross-passages for communicating lubricating fluid to the speed ratio modules.

3. The power transmission of claim 1 further comprising an input module for coupling the power transmission to a prime mover, the input module having a modular housing adapted for joinder to the fixed housing of a speed ratio module.

4. The power transmission of claim 3 wherein the input module includes a torque converter.

5. The power transmission of claim 1 further comprising a directional control module having a modular housing adapted for joinder to the fixed housing of at least one speed ratio module.

* * * * *